US005692705A

United States Patent [19]
Bellais

[11] Patent Number: 5,692,705
[45] Date of Patent: Dec. 2, 1997

[54] ANTI-CRASH SEAT WITH HARNESS FOR AN AIRCRAFT

[75] Inventor: Laurent Bernard Frédéric Bellais, Marignane, France

[73] Assignee: Eurocopter France, Marignane Cedex, France

[21] Appl. No.: 571,654

[22] Filed: Dec. 13, 1995

[30] Foreign Application Priority Data

Dec. 13, 1994 [FR] France ................. 9414967

[51] Int. Cl.⁶ ............................................. B64D 11/06
[52] U.S. Cl. .............................................. 244/122 R
[58] Field of Search ................. 294/118.1, 122 R, 294/118.6; 297/216.17, 216.13, 216.1, 216.15, 216.16; 280/805, 806

[56] References Cited

U.S. PATENT DOCUMENTS

| | | | |
|---|---|---|---|
| 3,410,153 | 11/1968 | Merna | 244/122 R |
| 4,408,738 | 10/1983 | Mazelsky | 244/122 R |
| 4,480,713 | 11/1984 | Macht et al. | 280/801.1 |
| 5,451,094 | 9/1995 | Templin et al. | 297/216.1 |

FOREIGN PATENT DOCUMENTS

WO82/01854  6/1982  WIPO.

Primary Examiner—Andres Kashnikow
Assistant Examiner—Tien Dinh
Attorney, Agent, or Firm—Fisher, Christen & Sabol

[57] ABSTRACT

The invention relates to an anti-crash seat with harness for an aircraft.

The seat is mounted with limited sliding on at least one substantially vertical support (8), integral with the structure of said aircraft and associated with at least one energy-absorbing device (12), located between said seat and said structure. Advantageously:

- it is shaped as a bench (2) defining a plurality of seating spaces which are located side by side and each of which is equipped with a safety harness (6);
- it includes at least one additional energy-absorbing device (16), situated between said structure of the aircraft and a coupling mechanism (17) with locking provided at least at one of said seating spaces; and said mechanism (17) for coupling between said bench and said additional device is controlled by the harness (6) associated with said seating space.

6 Claims, 6 Drawing Sheets

FIG.8

ANTI-CRASH SEAT WITH HARNESS FOR AN AIRCRAFT

BACKGROUND OF THE INVENTION

1. Field of the Invention

The present invention relates to an anti-crash seat with harness for an aircraft, intended to be mounted on board helicopters or airplanes.

2. Background Art

In the present description, the word "harness" denotes in general any means for fastening a passenger into his or her seat, such as the safety belts provided on airplane seats, the safety diagonal strap harnesses provided on motor vehicle seats or alternatively the shoulder harnesses associated with the seats of race cars or with the seats of aircraft pilots, or example.

Anti-crash seats equip helicopters especially owing to the standards imposed by the legislation in force, and their purpose, in hard landings, is to absorb the shocks and deformations which are due to the impact, by limiting the deceleration of the seats with respect to the structure of the helicopter, so as to guarantee the survival of the passengers transported.

To achieve rhea, the anti-crash seats currently in use in helicopters are of the individual seating space type. Each seat is mounted, with limited sliding, on at least substantially vertical support, integral with the structure of the aircraft and associated with an energy-absorbing device which is located between the seat and the structure. Thus, in the event of a hard landing, the energy-absorbing device brakes the sliding of the seat with respect to the support, therefore reducing the deceleration of said seat, that is to say the deceleration to which the passenger is subjected.

These anti-crash seats, although they provide appreciable safety, nevertheless lead to a significant additional mass, the production of anchoring points on the structure of the helicopter (one support per seat) and more lengthy maintenance, which especially penalized the transport capacity of the helicopter, its performance and its cost.

BROAD DESCRIPTION OF THE INVENTION

The object of the present invention is to overcome these drawbacks, and the invention relates to an anti-crash seat for an aircraft, the design of which makes it possible to reduce its mass and its installation cost, while guaranteeing and reinforcing the shock resistance of the seat.

To this end, the anti-crash seat with harness for an aircraft, mounted with limited sliding on at least one at least substantially vertical support, integral with the structure of said aircraft and associated with at least one energy-absorbing device, located between said seat and said structure, is noteworthy according to the invention in that

- it is shaped as a bench defining a plurality of seating spaces which are located side by side and each of which is equipped with a safety harness;
- it includes at least one additional energy-absorbing device, situated between said structure of the aircraft and a coupling mechanism with locking provided at least at one of said seating spaces; and
- said mechanism for coupling between said bench and said additional device is controlled by the harness associated with said seating space.

Thus, by virtue of the invention, one and the same single-piece bench allows several passengers to be seated, which reduces the mass of the seat and the anchoring points to be produced (one or two supports for benches with three seating spaces for example), by comparison with the usual installation of one seat per passenger. Furthermore, the bench with multiple seating spaces makes it possible to take account of the number and location of the passengers present in the seating spaces by virtue of the additional device which is rendered operational only when the harnesses associated with said seating spaces are buckled, and which thus plays an active part in absorbing the shocks in the event of a hard landing by the helicopter, in addition to the energy-absorbing device usually installed which permanently operational.

Advantageously, said coupling mechanism with locking is associated with a winder mechanism for said harness, fixed to said bench and capable, when said harness is buckled, of bringing about the locking of said additional device by said coupling mechanism to render said additional device operational. Thus, a winder mechanism already provided on the seat is used to provide for the locking of the additional device, via a coupling mechanism, without resorting to fitting further components.

For preference, said coupling mechanism and said winder mechanism for said harness are provided on the back of the corresponding seating space of said bench. Also, said coupling mechanism advantageously interacts with a rotary spindle of said winder mechanism, so as to lock said additional device when said harness is put on, leading to the rotation of said spindle.

More particularly, said coupling mechanism may comprise a housing which is fixed to the corresponding seating space of said bench and inside which there is provided a shaft mounted on said spindle of the winder mechanism and able, by its translational displacement under the action of said rotary spindle of the winder mechanism, to lock said additional device. According to a first embodiment, said shaft of the coupling mechanism engages in one end of said additional device to lock it, when the spindle of said winder mechanism is driven in rotation by unwinding the harness.

According to a second embodiment, said coupling mechanism is equipped with a lock mounted so it can pivot on said housing and able to block said additional device by the action of a leaf spring integral with said shaft of the coupling mechanism and holding a peg of said lock when said shaft is translationally displaced by said spindle of the winder mechanism.

Furthermore, said additional energy-absorbing device is connected, by its ends, to said support and to said coupling mechanism, said energy-absorbing device is connected, by its ends, to said support and to said bench, and said energy-absorbing device and said additional energy-absorbing device are defined by dampers.

According to a particular layout example, said bench comprises at least three seating spaces and it is mounted so that it can slide on at least two substantially vertical supports, two energy-absorbing devices being located respectively between said supports and the back of said bench, and at least two additional energy-absorbing devices being located respectively between said supports and said coupling mechanisms provided on the back of the outer seating spaces of said bench.

In general, associated with each of the seating spaces of said bench may be an additional energy-absorbing device capable of interacting with the corresponding harness via said coupling mechanism with locking.

BRIEF DESCRIPTION OF THE DRAWINGS

The figures of the appended drawing will make it easy to understand how the invention may be achieved. In these figures, identical references denote similar elements.

DETAILED DESCRIPTION OF THE INVENTION

Figure 1:
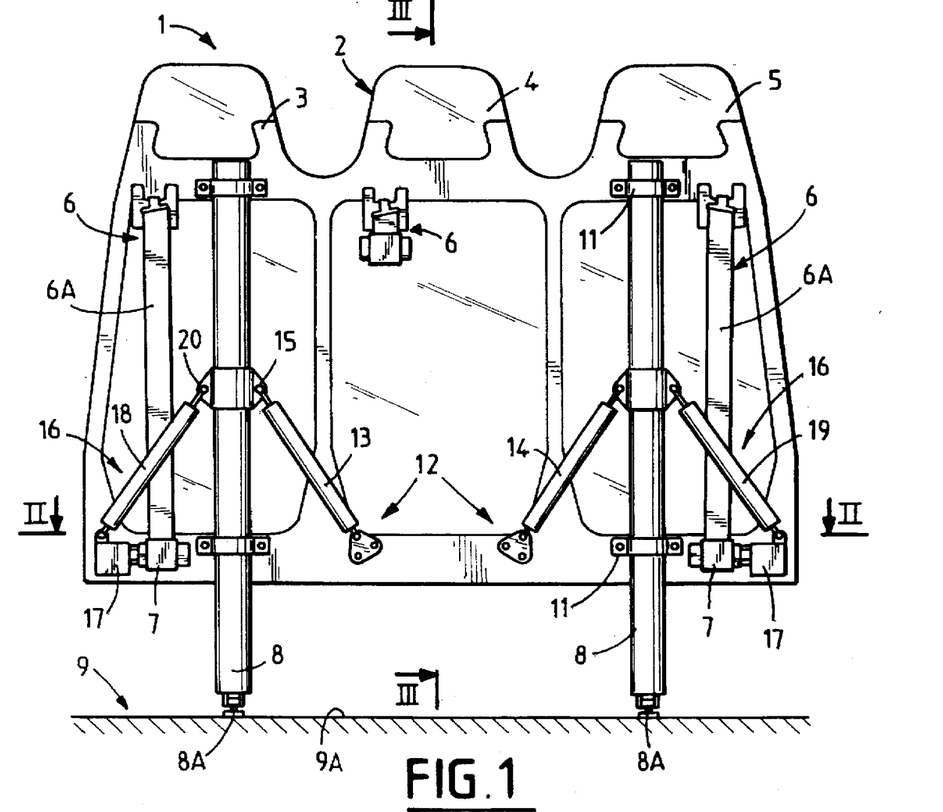
FIG. 1 shows, viewed from the rear, one embodiment of the anti-crash seat in accordance with the invention, with a first mounting of the additional energy-absorbing device.
Figure 2:
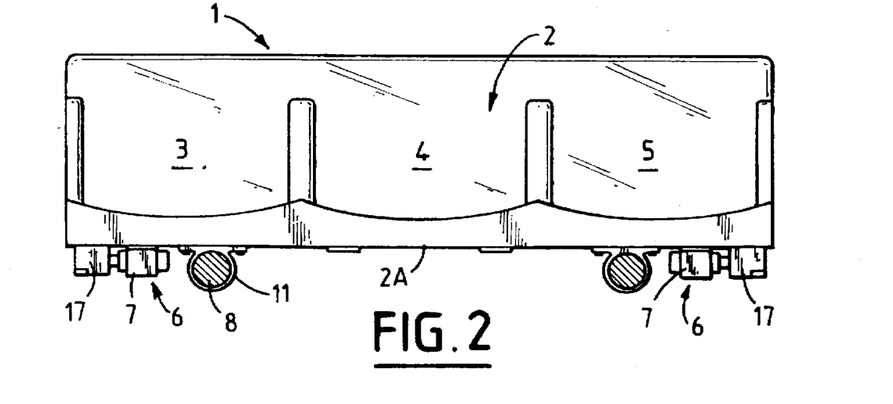
FIG. 2 is a section on II—II of FIG. 1, showing the coupling mechanism with locking of said additional device and the winder mechanism for said harness.
Figure 3:
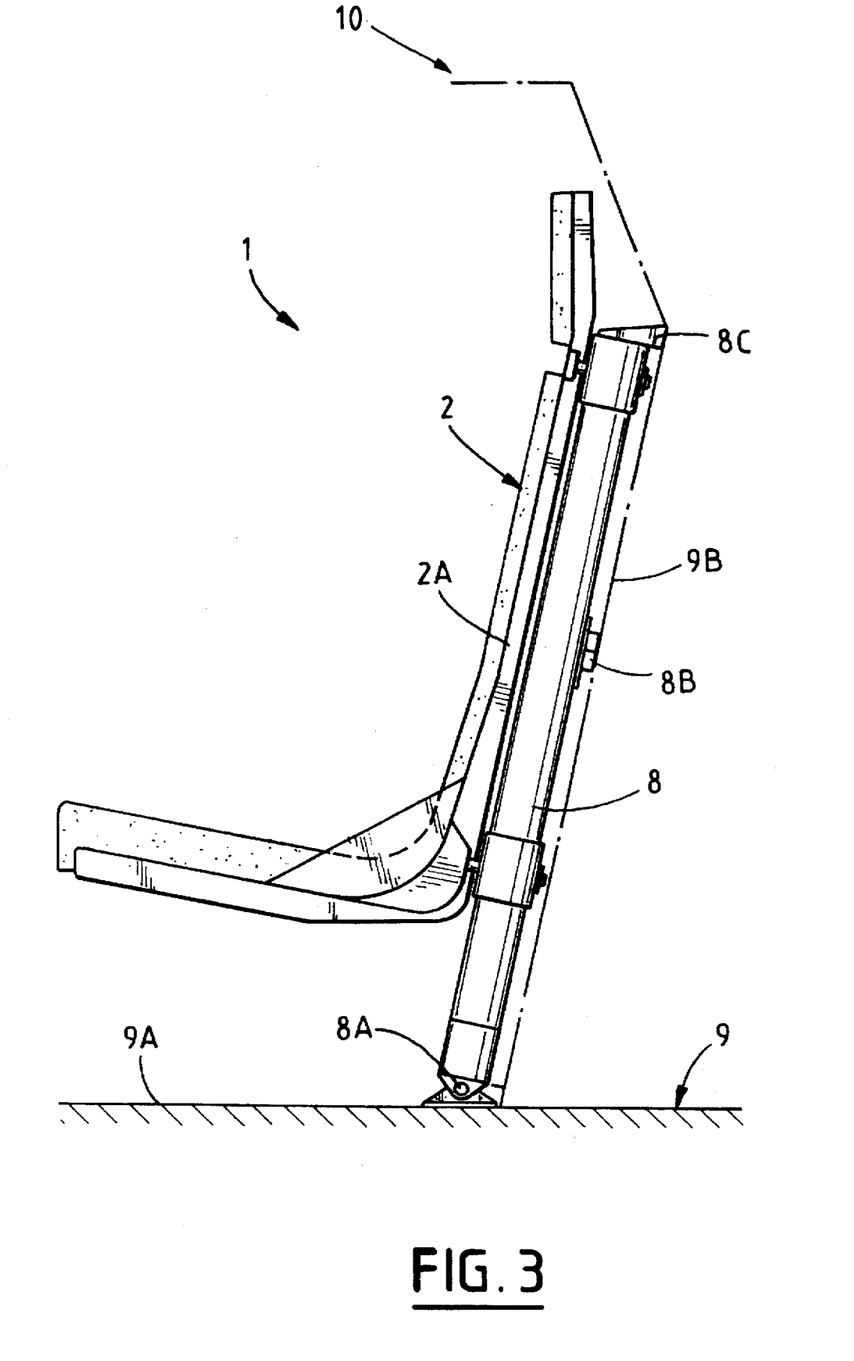
FIG. 3 is a section of the seat on III—III of FIG. 1.

The anti-crash seat 1 for an aircraft, shown in FIGS. 1 to 3, according to the invention is in the form of a bench 2, preferably a rigid one, defining a plurality of seating spaces 3, 4, 5 located side by side in line abreast and numbering three in this embodiment. Of course, the number of seating spaces formed by the bench could be different, to include at least two seating spaces. In the usual fashion, said seating spaces of the bench are equipped with seat cushions, with backrests, with headrests and with armrests contributing to the comfort and retention of the passengers.

Each of the seating spaces is equipped with a safety harness 6 of the diagonal strap type, mounted on the backrest 2A of the bench and comprising a winder mechanism, for example an inertia winder mechanism 7, fixed to the rear of the backrest, behind each seating space. The bench 2 with multiple seating spaces is mounted so that it can slide, with limited travel, on two identical approximately vertical supports 8 which are integral with the structure 9 of the aircraft 10, such as a helicopter, and which are situated after the bench has been mounted, behind the outer seating spaces 3 and 5 of the seat. These supports 8 consist of hollow tubes of cylindrical section, on which the bench is arranged by means of bearings 11.

In the case of mounting in a helicopter, as shown in FIG. 3, the lower end of each support 8 is articulated, by a ball joint 8A, to the floor 9A of the structure, and fittings 8B and 8C, respectively provided centrally and at the upper end of the supports, associate the latter with one of the partitions 9B of the helicopter.

Furthermore, the anti-crash seat 1 comprises an energy-absorbing device 12 which is provided between the supports 8 and the bench 2 with multiple seating spaces. It includes, for example, two dampers 13, 14, each of which is located between one of the supports 8 and the backrest 2A of the seat, via links 15. It may be seen in FIG. 1 that, with respect to the vertical sectioning plane III—III passing through the middle of the bench, the two dampers are arranged symmetrically inclined, their lines of action converging toward the floor 9A of the helicopter. From the functional point of view, these dampers 13, 14 are operational permanently, that is to say that in the event of a hard landing, irrespective of the number and location of the passengers on the bench, they fulfill their role of absorbing energy, braking the displacement of the bench 2 with respect to the supports 8. In order to avoid any inadvertent triggering just of the dampers 13 and 14 as the passengers become seated, their triggering threshold is set to withstand at least the load of three (in this example) passengers weighing almost 100 kg each, under a vertical acceleration of more than 2.5 g.

Advantageously, the anti-crash seat 1 with bench 2 having multiple seating spaces is equipped with an additional energy-absorbing device 16 which is then situated between the approximately vertical supports 8, integral with the structure of the helicopter, and coupling mechanisms 17 with locking which are provided on the backrest 2A of the bench. In this embodiment shown in FIG. 1, the additional device 16 is composed of two dampers 18, 19 which are arranged symmetrically, in an inclined fashion, with respect to the vertical midplane III—III of the bench, and on the opposite side from the dampers 13, 14 with respect to said supports 8. On one side, the dampers 18, 19 of the additional support are articulated by links 20 to the respective supports 8, whereas on the other side they may be associated by locking with the corresponding coupling mechanisms 17 which are fixed behind the outer seating spaces 3, 5 of the bench and which are each cooperating with the winder mechanism 7 for the respective harness 6. From the functional point of view, these dampers 18, 19 of the additional device 16 are rendered operational only when the straps 6A of the harnesses are pulled by passengers sitting in the seating spaces, which causes the dampers to be locked by the coupling mechanisms 17, via the winder mechanisms 7 for the harnesses 6. When these dampers 18, 19 are locked, their triggering threshold is set to withstand at least the loading of three (in this example) passengers weighing almost 100 kg each, under a vertical acceleration of more than 5 g for example.

Figure 4:
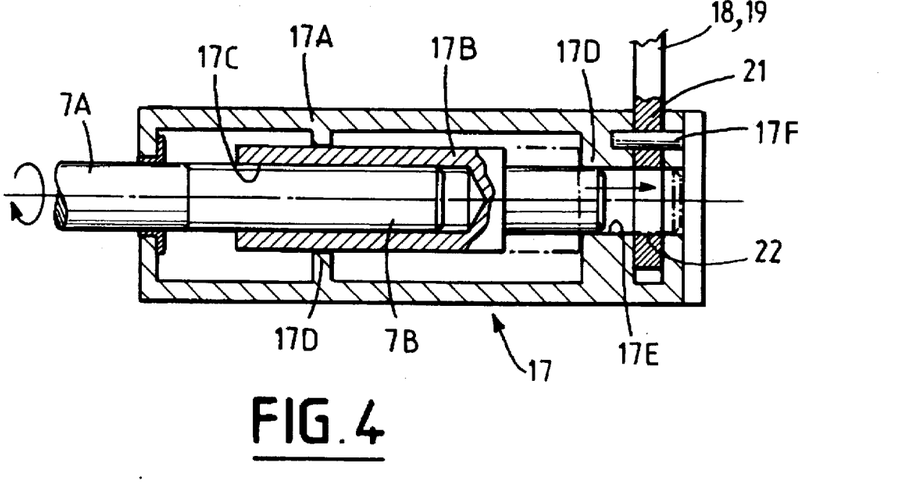
FIGS. 4 and 5 represent respectively two embodiments of the coupling mechanism with locking.

More particularly, the coupling mechanism 17 with locking comprises, in a first embodiment illustrated in FIG. 4, a housing 17A which is fixed to the backrest 2A of the bench, behind the corresponding seating spaces, in this case 3 and 5. Inside the housing 17A is provided a shaft 17B having a tapped axial hole 17C and supported by bearings 17D of the housing. Screwed into the tapped hole 17C is the threaded end 7B of the spindle 7A of said winder mechanism 7, which engages coaxially with the shaft 17B in the housing 17A. The link between the shaft 17B and the spindle 7A is of the slideway type, that is to say that the rotation of the spindle 7A, under the action of the unwinding of the belt 6A of the harness, generates a translational displacement of the shaft 17B mounted on the spindle. The corresponding end of the damper 18, 19 of said additional device ends for example in the shape of an eye fitting 21 which engages in the housing 17A, such that the eye 22 in the eye fitting 21 is coaxial with the internal passage 17E delimited by the corresponding bearing 17D supporting said shaft. A pin 17F made of fusible material positions the damper on the housing. If there is no passenger in this seating space, the fusible pin releases the damper after it has exceeded its shear limit.

It may therefore be understood that the rotation of the spindle 7A of the winder mechanism 7, as a consequence of the strap 6A having been unwound by a passenger sitting in the corresponding seating space, leads to the translation of the shaft 17B in the direction of the arrow indicated in FIG. 4, with respect to the housing 17A, which shaft then engages in the eye 22 of the eye fitting, locking the damper to the housing. In this way, the damper is rendered operational. The position of the shaft 17B immobilizing the eye fitting of the damper is shown in chain line in FIG. 4. Quite clearly, the rotation of the spindle 7A in the opposite direction, as a consequence of the strap being retracted by the passenger when he gets up from his place, causes an opposite translation of the shaft 17B, which then releases the damper and renders it inoperative.

Figure 5:
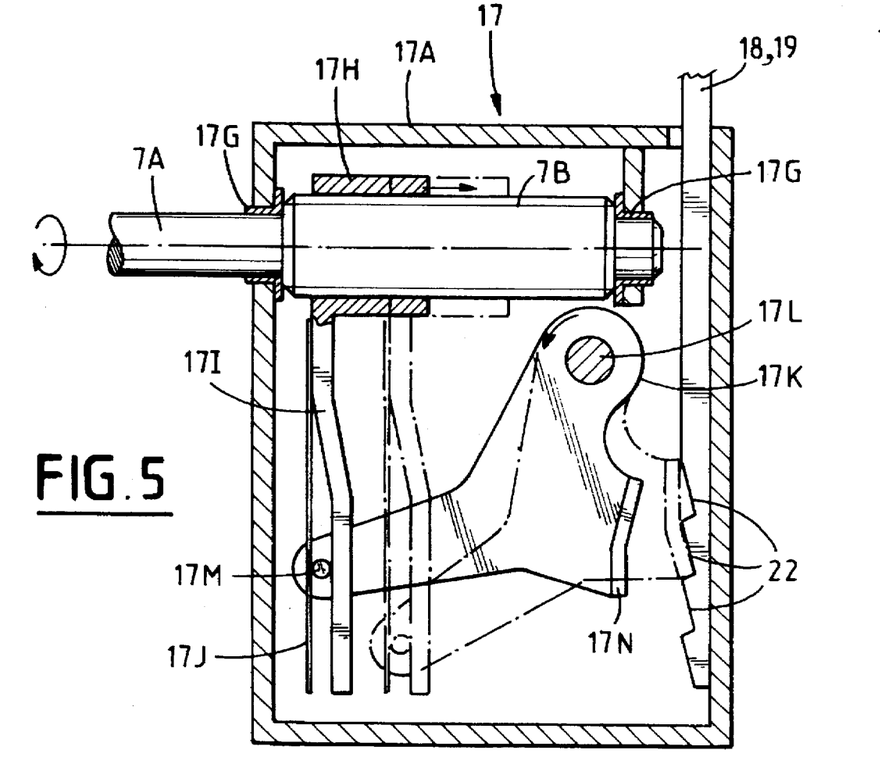

In a second embodiment illustrated in FIG. 5, the coupling mechanism 17 with locking comprises, as before, a housing 17A which is fixed to the back of the corresponding seating space and inside which is engaged the threaded end 7B of the spindle 7A of said winder mechanism 7. This end 7B is supported by two bearings 17G provided in the housing. Screwed around the threaded end 7B of the spindle is a shaft 17H whose link is similar to the one described previously. That is to say that a rotational movement of the spindle 7A leads to a translational movement of the shaft 17H. Moreover, the shaft 17H is extended by a rigid lug 17I to which is fixed, on one side, an elastic leaf 17J. A component forming a lock 17K is furthermore mounted so that it can pivot about a spindle 17L integral with the housing and orthoganol to the spindle 7A. This component forming a lock has a peg 17M which is arranged between the lug 17I and the elastic leaf 17J of the shaft, thus being trapped therebetween. In addition, the component forming a lock 17K includes a projection 17N which is capable of interacting with notches 22 in which, in this embodiment, the corresponding end of the damper 18, 19 terminates.

It will therefore be understood that, after the spindle 7A has rotated and the shaft 17H has moved translationally, the peg 17M shifts along the rigid lug 17I of the shaft, which causes the lock 17K to rotate about its spindle 17L and causes the projection 17N to engage in the corresponding notch 22 of the damper, which then becomes operational.

Regardless of the embodiment used, the locking and unlocking of the dampers of the additional energy-absorbing device 16 take place automatically upon action of the strap 6A, via the coupling mechanism 17 associated with the spindle of the winder mechanism 7 and acting on the damper in question.

The anti-crash seat 1 provided with the energy-absorbing devices 12 and 16 is therefore designed to take account of the disparity in the masses present on the bench, these being associated with the various arrangement possibilities with one, two or three passengers seated. In the example described hereinabove, the seat has two dampers 13, 14 which are permanently operational above and beyond a predetermined triggering threshold, and another two dampers 18, 19 which are rendered operational, also above and beyond a predetermined triggering threshold, only when the safety harnesses 6 of the corresponding outer seating spaces are buckled, signifying the presence of a passenger. These dampers 18, 19 with automatic engagement via the mechanisms 7 and 17 have a force/displacement curve with changing characteristic, that is to say that the resistive force of each damper increases as a function of its extension, which optimizes the crushing travel.

In general, when the vertical loadings to which the passengers following a hard landing of the aircraft become greater than the physiologically permissible values, the devices trigger to allow the bench to slide along the supports with a reaction force, as they extend, compatible with the limits which are acceptable to the passengers.

Figure 6A:
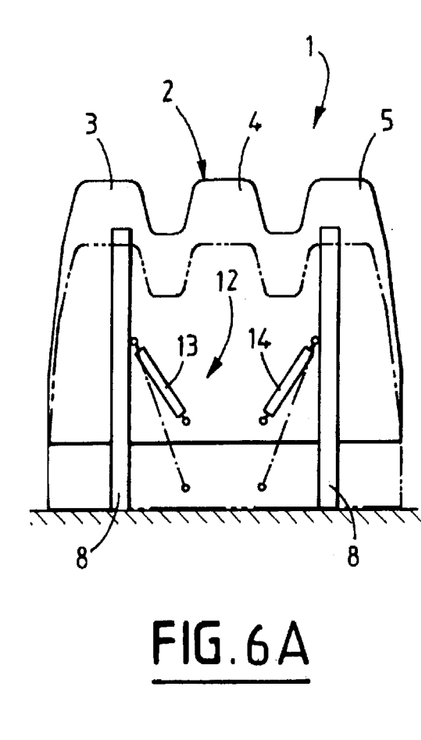
FIGS. 6A, 6B and 6C diagrammatically illustrate the functioning of the energy-absorbing devices depending on the position of the passengers on the bench.

More particularly, if a passenger has settled down in the central seating place 4 of the bench, only the two dampers 13, 14 of the energy-absorbing device 12 come into play in the event of a hard landing. These, by extending, make it possible efficiently to absorb the loadings due to the shocks, braking the deceleration of the bench 2 with respect to the supports 8, as FIG. 6A shows.

Figure 6B:
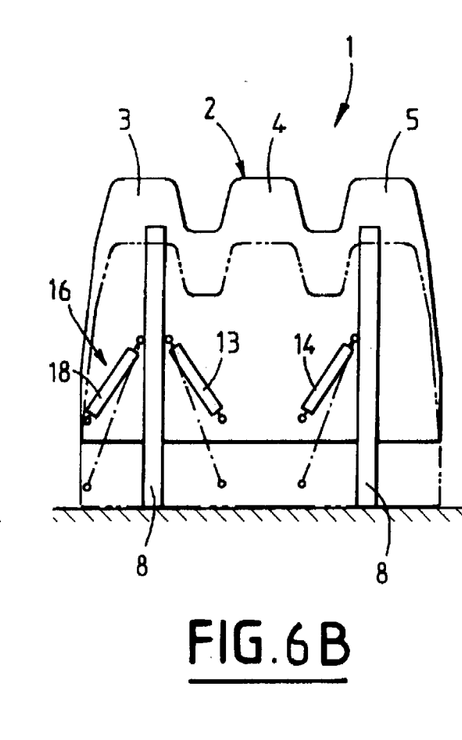

In the case where a passenger occupies one of the outer seating spaces 3, 5 of the bench, in conjunction or not with a passenger seated in the central seating space 4, the two dampers 13, 14 of the device 12 are operational, as is the damper 18 or 19 of the additional device 16. As FIG. 6B shows, what happens is that the act of putting on the strap 6A of the corresponding harness has led to the damper 18 or 19 being locked onto the coupling mechanism 17, via the rotation of the spindle 7A of the winder mechanism 7 for the harness 6.

Figure 6C:
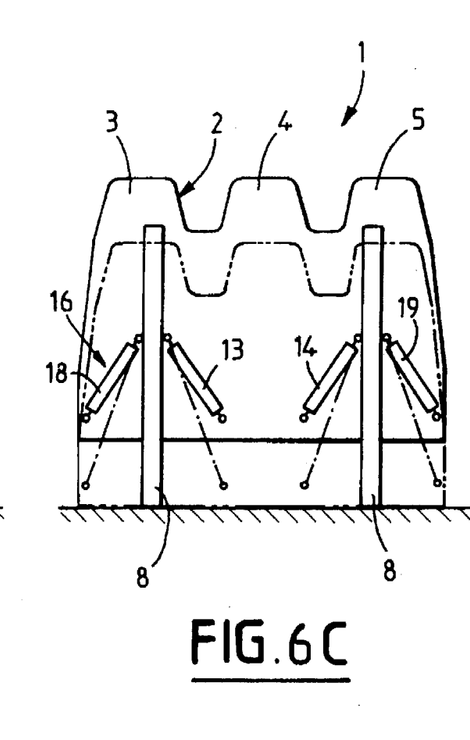

In the case where two passengers are seated in the outer seating spaces 3, 5 of the bench, in conjunction or not with a passenger seated in the central seating space 4, the two dampers 13, 14 of the device 12 and the two dampers 18, 19 of the additional device 16 are then operational, to absorb effectively the energy generated by the shock if the helicopter has a hard landing, as FIG. 6C shows.

Figure 7:
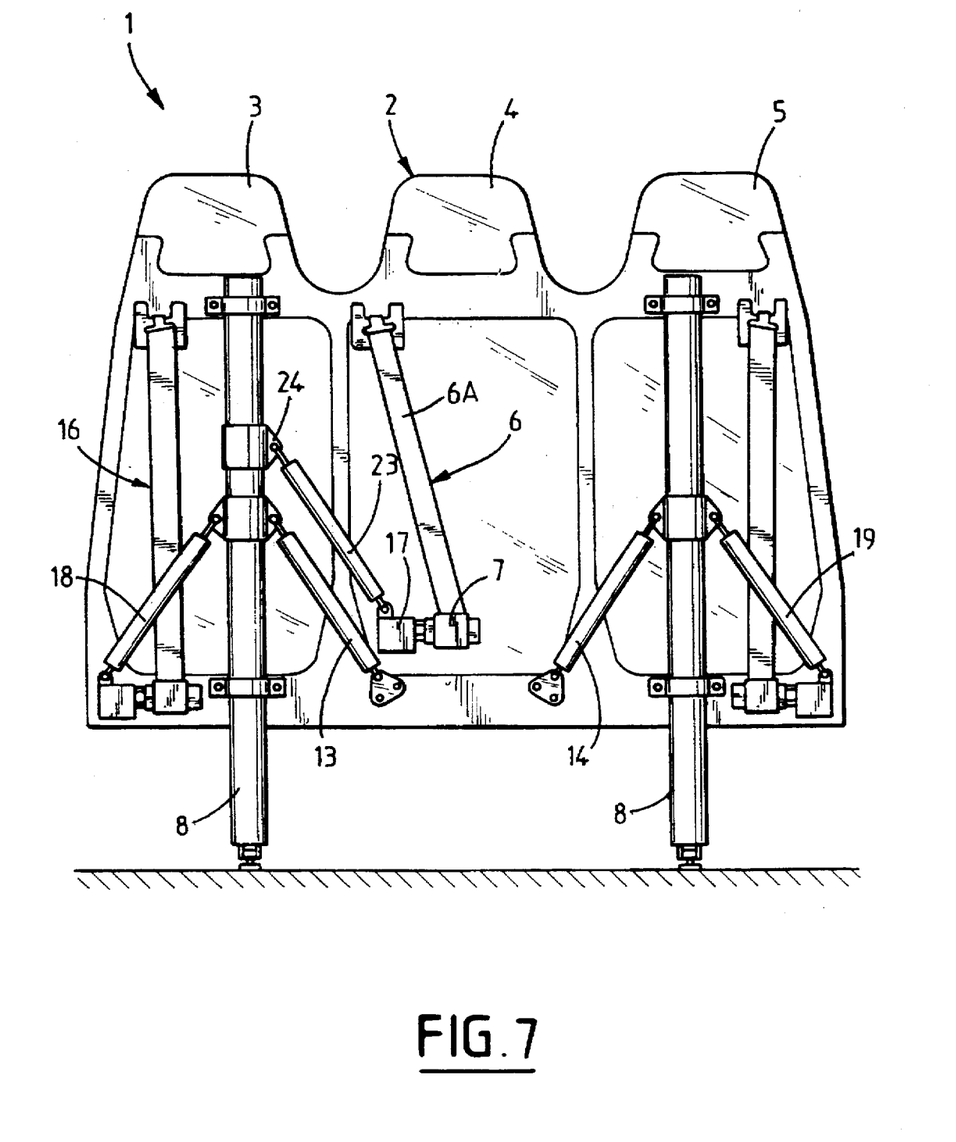
FIGS. 7 and 8 show, viewed from the rear, the anti-crash seat respectively with a second and with a third mounting of the additional energy-absorbing device.

In the seat 1 illustrated in FIG. 7 and corresponding to the one described earlier, a third damper 23 is added to the energy-absorbing device 16. It may be seen that this third damper 23 is located between the support 8, to which the damper 13 is articulated, and parallel to the latter, via a link 24, and a coupling mechanism 17 mounted to cooperate with the winder mechanism 7 for the harness 6 provided on the back of the central seating space 4. Thus, as soon as a passenger has settled down in any one of the seating spaces of the bench 2, by putting on the harness in question he or she renders operational the corresponding damper of the additional device 16, in addition to the dampers 13, 14 of the device 12, which are always in use.

Figure 8:
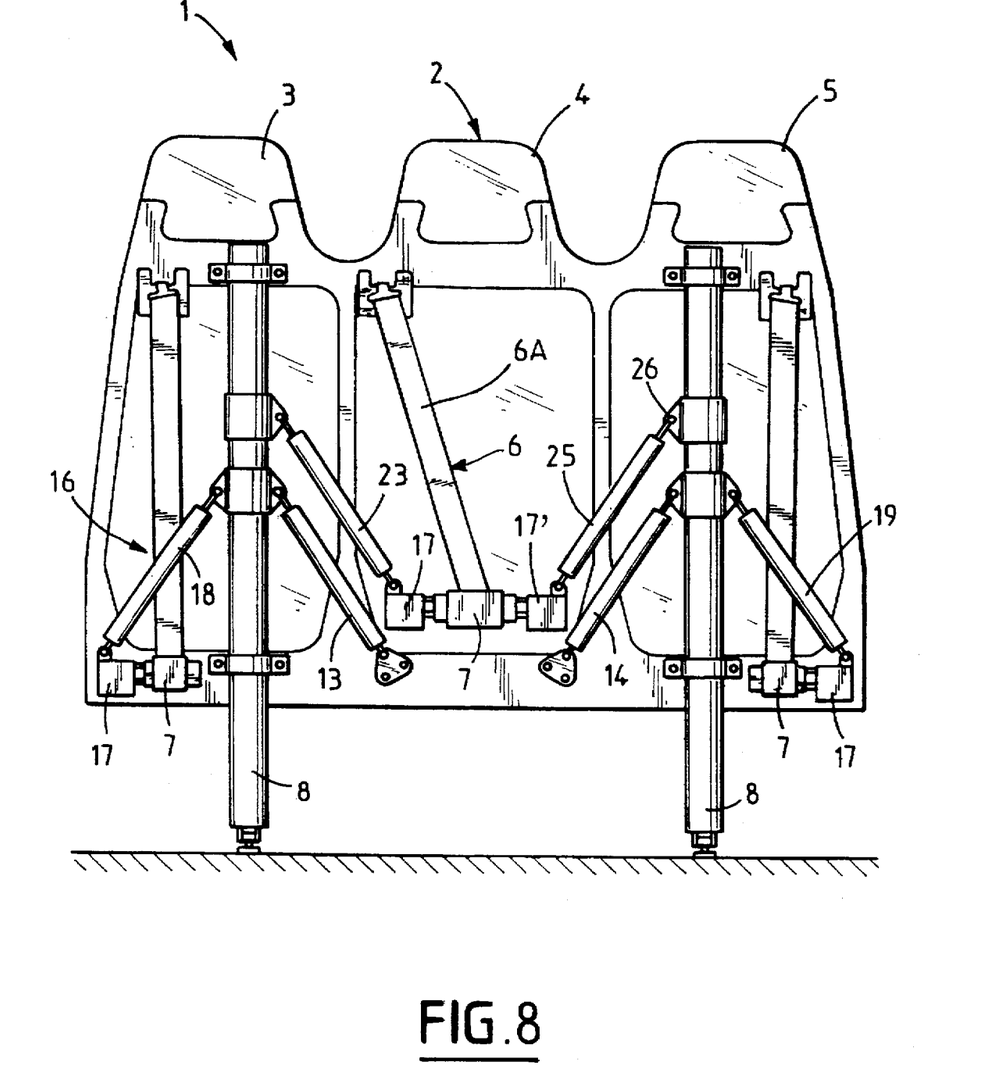

In the seat 1 illustrated in FIG. 8, a fourth damper 25 is added to the energy-absorbing device 16 of FIG. 7. This fourth damper 25 is arranged parallel to the damper 14 and is located between the corresponding support 8 via a link 26 and a coupling mechanism 17' mounted to cooperate with the winder mechanism 7 for the central harness 6. The link between the two coupling mechanisms 17 and 17' and the winder mechanism 7 takes place for example via its spindle 7A, the threads on the ends of which are then of opposite hand. The energy-absorption effectiveness of the seat is further increased using this arrangement.

The bench of the seat 1, of the single-piece type, may be made from carbon for example.

Although the seat described corresponds to one for mounting in a helicopter, it goes without saying that it could be adapted for an airplane.

What is claimed is:

1. An anti-crash seat with harness for an aircraft having a structure, said seat being mounted with limited sliding on at least one at least substantially vertical support (8), integral with said structure of said aircraft and associated with at least one energy-absorbing device (12), located between said seat and said structure, said anti-crash seat:

being shaped as a bench (2) defining a plurality of seating spaces which are located side by side and each of which is equipped with a safety harness (6); and including at least one additional energy-absorbing device (16), situated between said structure of the aircraft and a coupling mechanism (17) provided at least one of said seating spaces for coupling between said bench and said additional energy-absorbing device, said coupling mechanism being controlled by the harness (6) associated with said seating space and interacting with a rotary spindle (7A) of a winder mechanism (7) for said harness (6), fixed to said bench and capable, when said harness (6) is buckled, of rotating said rotary spindle (7A) so as to lock said additional energy-absorbing device (16) by said coupling mechanism (17) to render said additional energy-absorbing device operational.

2. The seat as claimed in claim 1, wherein said coupling mechanism (17) and said winder mechanism (7) for said harness are provided on the back of the corresponding seating space of said bench (2).

3. The seat as claimed in claim 1, wherein said coupling mechanism (17) comprises a housing (17A) which is fixed to the corresponding seating space of said bench and inside which there is provided a shaft (17B, 17H) mounted on said spindle (7A) of the winder mechanism (7) and able, by its translational displacement under the action of said rotary spindle of the winder mechanism, to lock said additional device (16).

4. The seat as claimed in claim 3, wherein said shaft (17B) of the coupling mechanism (17) engages in one end of said additional device (16) to lock it, when the spindle (7A) of said winder mechanism is driven in rotation by unwinding the harness.

5. The seat as claimed in claim 4, wherein said coupling mechanism (17) is equipped with a lock (17K) mounted so it can pivot on said housing and able to block said additional device (16) by the action of a leaf spring (17J) integral with said shaft of the coupling mechanism and holding a peg of said lock when said shaft is translationally displaced by said spindle of the winder mechanism.

6. The seat as claimed in claim 1, wherein said additional energy-absorbing device (16) is connected, by its ends, to said support (6) and to said coupling mechanism (17), wherein said energy-absorbing device (12) is connected, by its ends, to said support (8) and to said bench (2), and wherein said energy-absorbing device (12) and said additional energy-absorbing device (16) are defined by dampers.

* * * * *